(12) United States Patent
Haller (10) Patent No.: US 10,295,077 B2
(45) Date of Patent: May 21, 2019

(54) ASSURING DROPOUT OF SOLENOID VALVE CONTROLLED BY PEAK-AND-HOLD DRIVER

(71) Applicant: Automatic Switch Company, Florham Park, NJ (US)

(72) Inventor: John J. Haller, Boonton, NJ (US)

(73) Assignee: Automatic Switch Company, Florham Park, NJ (US)

( * ) Notice: Subject to any disclaimer, the term of this patent is extended or adjusted under 35 U.S.C. 154(b) by 418 days.

(21) Appl. No.: 15/073,071

(22) Filed: Mar. 17, 2016

(65) Prior Publication Data

US 2017/0023147 A1    Jan. 26, 2017

Related U.S. Application Data

(60) Provisional application No. 62/135,140, filed on Mar. 18, 2015.

(51) Int. Cl.
*F02D 41/20*    (2006.01)
*H01F 7/06*    (2006.01)
(Continued)

(52) U.S. Cl.
CPC .......... *F16K 31/0675* (2013.01); *F02D 41/20* (2013.01); *H01F 7/064* (2013.01);
(Continued)

(58) Field of Classification Search
CPC ............. F02D 41/20; F02D 2041/2058; F02D 2041/2003; F02D 2041/2034; H01F 7/1844
(Continued)

(56) References Cited

U.S. PATENT DOCUMENTS 3,577,040 A    5/1971 Campbell, Jr.
3,906,294 A    9/1975 Lourigan
(Continued)

FOREIGN PATENT DOCUMENTS

CN    101477870 A    7/2009
CN    103051290 A    4/2013
(Continued)

OTHER PUBLICATIONS

PCT Search Report for PCT Application No. PCT/US2016/022889 dated Jun. 27, 2016.
(Continued)

*Primary Examiner* — Dharti H Patel
(74) *Attorney, Agent, or Firm* — Mackey Law Firm PLLC (57) ABSTRACT

Systems and methods of controlling a solenoid coil in a solenoid valve provide a controller that allows a supervisory or leakage current to be used in a peak-and-hold driver. The controller introduces a delay time after detection of a dropout voltage that prevents the solenoid coil from being immediately re-energized in order to ensure proper dropout of the solenoid coil. The delay time imposes a wait period during which the controller takes no action with respect to the current in the solenoid coil, allowing the solenoid coil to deenergize and return the valve to its normally-open or normally-closed position. Such use of a delay time may be limited to instances where the controller has already gone through a power-up cycle such that the response time needed by the controller to energize the solenoid coil is minimized, thus reducing the valve startup time.

15 Claims, 11 Drawing Sheets

(51) Int. Cl.
*H01F 7/18* (2006.01)
*F16K 31/06* (2006.01)

(52) U.S. Cl.
CPC ......... *H01F 7/1805* (2013.01); *H01F 7/1844* (2013.01); *F02D 2041/2044* (2013.01); *H01F 7/1838* (2013.01)

(58) Field of Classification Search
USPC ................................................ 361/152, 93.1
See application file for complete search history.

(56) References Cited

U.S. PATENT DOCUMENTS

| | | | |
|---|---|---|---|
| 4,328,526 A | | 5/1982 | Dilger et al. |
| 4,453,652 A | * | 6/1984 | Merkel ................ H01F 7/1805 222/504 |
| 4,630,165 A | | 12/1986 | D'Onofrio |
| 4,706,619 A | | 11/1987 | Buchl |
| 4,741,365 A | | 5/1988 | Van Ornum |
| 4,764,840 A | * | 8/1988 | Petrie ................ H01H 47/325 123/490 |
| 4,873,606 A | * | 10/1989 | Pannier ................ G05B 9/02 361/152 |
| 4,911,192 A | | 3/1990 | Hartfiel et al. |
| 4,949,215 A | | 8/1990 | Studtmann et al. |
| 5,377,068 A | | 12/1994 | Kaylor et al. |
| 5,784,245 A | | 7/1998 | Moraghan et al. |
| 5,815,365 A | | 9/1998 | Stege |
| 6,188,562 B1 | | 2/2001 | Lutz et al. |
| 6,920,763 B2 | | 7/2005 | Amundsen et al. |
| 7,578,481 B2 | | 8/2009 | Smith et al. |
| 7,903,383 B2 | | 3/2011 | Fukano et al. |
| 8,059,382 B2 | | 11/2011 | Schmidt |
| 8,925,566 B2 | | 1/2015 | Haller |
| 2006/0221534 A1 | | 10/2006 | Oide |
| 2009/0015980 A1 | | 1/2009 | Fukano et al. |
| 2009/0138130 A1 | | 5/2009 | Aigner et al. |
| 2009/0309054 A1 | | 12/2009 | Haller et al. |
| 2011/0214741 A1 | | 9/2011 | Fukano et al. |
| 2012/0106019 A1 | * | 5/2012 | Buxton ................ H01F 7/1877 361/152 |
| 2013/0032739 A1 | | 2/2013 | Haller |

FOREIGN PATENT DOCUMENTS

| | | |
|---|---|---|
| CN | 102734541 B | 7/2013 |
| JP | H1029068 A | 2/1998 |
| JP | H11186032 A | 7/1999 |
| WO | 9014716 A1 | 11/1990 |
| WO | 9500960 | 1/1995 |
| WO | 2013019396 A1 | 2/2013 |

OTHER PUBLICATIONS

PCT Written Opinion for PCT Application No. PCT/US2016/022889 dated Jun. 27, 2016.

Extended European Search Report dated Oct. 10, 2018 for EP Application No. 16765750.1.

Office Action dated Sep. 20, 2018 for CN Application No. 201680025579.4.

* cited by examiner

FIG. 4D

ASSURING DROPOUT OF SOLENOID VALVE CONTROLLED BY PEAK-AND-HOLD DRIVER

CROSS REFERENCE TO RELATED APPLICATIONS

This application for patent claims the benefit of priority to, and hereby incorporates by reference, U.S. Provisional Application Ser. No. 62/135,140, entitled "Assuring Dropout of Solenoid Valve Controlled By Peak-and-Hold Driver," filed Mar. 18, 2015.

FIELD OF THE INVENTION

The embodiments disclosed herein relate generally to systems and methods of controlling solenoid valves and particularly to systems and methods of controlling a solenoid valve that employs a peak-and-hold driver.

BACKGROUND OF THE INVENTION

Solenoid-controlled valves, or solenoid valves, are used in a variety of flow control applications to control the flow of fluids, including liquids, gases, and the like. In such applications, a control signal is typically provided from an external source that indicates when a valve is to be opened and closed in order to control the flow of fluids. A driver circuit receives the control signal and actuates the valve by supplying electrical power to the solenoid coil. The driver circuit typically includes a controller that is programed to apply the electrical power to the solenoid coil to energize the coil, which causes the valve to open (for a valve that is normally closed). After a specified amount of time, the controller removes the electrical power from the solenoid coil to deenergize the coil, which causes the valve to close.

In some solenoid valves, the controller does not completely remove electrical power when the valve is to be closed. In these solenoid valves, the controller allows a small supervisory or leakage current to flow instead of removing all electrical power completely. The controller uses the supervisory or leakage current as a wiring integrity monitoring signal to monitor and ensure the integrity of the wiring to the valve. While this scheme has many benefits, a potential drawback is the small supervisory or leakage current may inadvertently cause the solenoid coil to remain energized when it is supposed to be deenergized (i.e., "drop out"), which may prevent the valve from properly closing.

One way to ensure dropout of the solenoid coil is disclosed in commonly-assigned U.S. Pat. No. 8,925,566, entitled "System and Method of Assuring Drop Out of a Solenoid Valve," which is incorporated herein by reference. This patent describes monitoring a control/actuation signal and, in a preferred embodiment, diverting all of that control/actuation signal to the solenoid coil if the signal is above a predetermined value (thereby energizing the solenoid coil), and diverting all of the control/actuation signal to a resistive load to be used as a wiring integrity signal otherwise (thereby ensuring the solenoid coil is deenergized).

The above solution, while appropriate for many solenoid valve applications, is less suitable for solenoid valves that use "peak-and-hold" drivers. The term "peak-and-hold" generally refers to a control scheme in which a large amount of electrical power (i.e., peak power) is initially applied to the solenoid coil to create a large initial pull-in force in order to move the valve mechanism to open the valve. Once the valve mechanism is moved, the large initial pull-in force is no longer needed and a smaller hold-in force requiring a smaller amount of electrical power (i.e., hold power) may be used to hold the valve open. Such a peak-and-hold scheme results in more efficient use of power and reduced heating of the solenoid coil.

Because the controller in a peak-and-hold driver applies two levels of power to the solenoid coil, a problem may arise if the controller allows a supervisory or leakage current to flow. Specifically, a condition may occur in peak-and-hold drivers where, as a result of the supervisory or leakage current, the controller may prematurely try to energize the solenoid coil during a dropout. This may result in current flowing in the windings of the solenoid coil that is large enough to not allow the solenoid coil to release the valve mechanism and properly close the valve.

Accordingly, a need exists for a way to assure dropout of a solenoid coil in a solenoid valve controlled by a peak-and-hold driver in which the controller allows a supervisory or leakage current to flow.

SUMMARY OF THE INVENTION

The embodiments disclosed herein relate to systems and methods of controlling a solenoid coil in a solenoid valve using a peak-and-hold driver in which a controller in the driver allows a supervisory or leakage current to flow. The disclosed embodiments introduce a delay time after detection of a dropout voltage that prevents the controller from prematurely re-energizing the solenoid coil. The delay time imposes a wait period during which the controller takes no action with respect to the current in the solenoid coil, allowing the solenoid coil to deenergize and return the valve to its normally-open or normally-closed position. In addition, the use of the delay time may be limited to instances where the controller has already gone through a power-up cycle such that the response time needed by the controller to energize the solenoid coil is minimized, thus reducing the valve startup time.

In general in one aspect, the disclosed embodiments relate to a peak-and-hold driver for a solenoid coil. The driver comprises, among other things, a solenoid controller connectable to the solenoid coil and configured to apply two levels of current to the solenoid coil to energize the solenoid coil, the two levels of current including a peak current and a hold current. The driver further comprises an input threshold detector connected to the solenoid controller and configured to put the solenoid controller in a reset mode, and a resistive load connected to the threshold detector. The resistive load is configured to receive a supervisory current when the solenoid coil is deenergized and provide at least a portion of the supervisory current to the threshold detector. The input threshold detector is configured to put the solenoid controller in the reset mode if the supervisory current provided to the input threshold detector, or a voltage corresponding to said supervisory current, is below a threshold level, and release the controller from the reset mode if the supervisory current provided to the input threshold detector, or a voltage corresponding to said supervisory current, is above the threshold level.

In general, in another aspect, the disclosed embodiments relate to a method of assuring drop out of a solenoid coil in a peak-and-hold driver. The method comprises, among other things, applying two levels of current to the solenoid coil to energize the solenoid coil, the two levels of current including a peak current and a hold current. The method additionally comprises receiving a supervisory current in a resistive load when the solenoid coil is deenergized, and detecting whether at least a portion of the supervisory current, or a voltage corresponding to said supervisory current, is above a threshold level. The method further comprises preventing application of current to the solenoid coil if the at least a portion of supervisory current, or a voltage corresponding to said supervisory current, is below the threshold level, and allowing application of current to the solenoid coil if the at least a portion of the supervisory current, or a voltage corresponding to said supervisory current, is above the threshold level.

In general, in yet another aspect, the disclosed embodiments relate to a solenoid valve system. The system comprises, among other things, a solenoid-controlled valve having a solenoid coil therein and a solenoid controller connectable to the solenoid coil. The solenoid controller is configured to apply two levels of current to the solenoid coil to energize the solenoid coil, the two levels of current including a peak current and a hold current. The system further comprises an input threshold detector connected to the solenoid controller and configured to put the solenoid controller in a reset mode, and a resistive load connected to the threshold detector. The threshold detector is configured to receive a supervisory current when the solenoid coil is deenergized and provide at least a portion of the supervisory current to the threshold detector. The input threshold detector puts the solenoid controller in the reset mode if the supervisory current provided to the input threshold detector, or a voltage corresponding to said supervisory current, is below a threshold level, and releases the controller from the reset mode if the supervisory current provided to the input threshold detector, or a voltage corresponding to said supervisory current, is above the threshold level.

In some embodiments, the threshold level is a threshold current level of 10 mA. In some embodiments, the solenoid controller is configured to restart operations upon being released from the reset mode and a warm start detector in the solenoid controller is configured to determine whether the solenoid controller restarts operations from a powered-up state. In some embodiments, a delay timer in the solenoid controller is configured to count down a predefined delay time if the warm start detector determines that the solenoid controller restarted from a powered-up state. In some embodiments, the predefined delay time is at least twice the time required for current in the solenoid coil to decay to a value that allows drop out of the solenoid coil.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

As mentioned above, the disclosed embodiments relate to systems and methods of controlling a solenoid coil in a solenoid valve that is controlled by a peak-and-hold driver in which a controller in the driver allows a supervisory or leakage current to flow. Among other things, the disclosed embodiments provide a delay time after detection of a dropout voltage that prevents the controller from immediately and prematurely re-energizing the solenoid coil. The delay time enforces a wait period during which the controller takes no action with respect to the solenoid coil, allowing the current in the solenoid coil to remain at a low value long enough for the valve to return to its normally-open or normally-closed position. Such a delay time may be applied after the controller has gone through a power-up cycle (i.e., a warm start) so the response time needed by the controller to issue an initial actuation signal to the valve is minimized, thus reducing the valve startup time.

Figure 1:
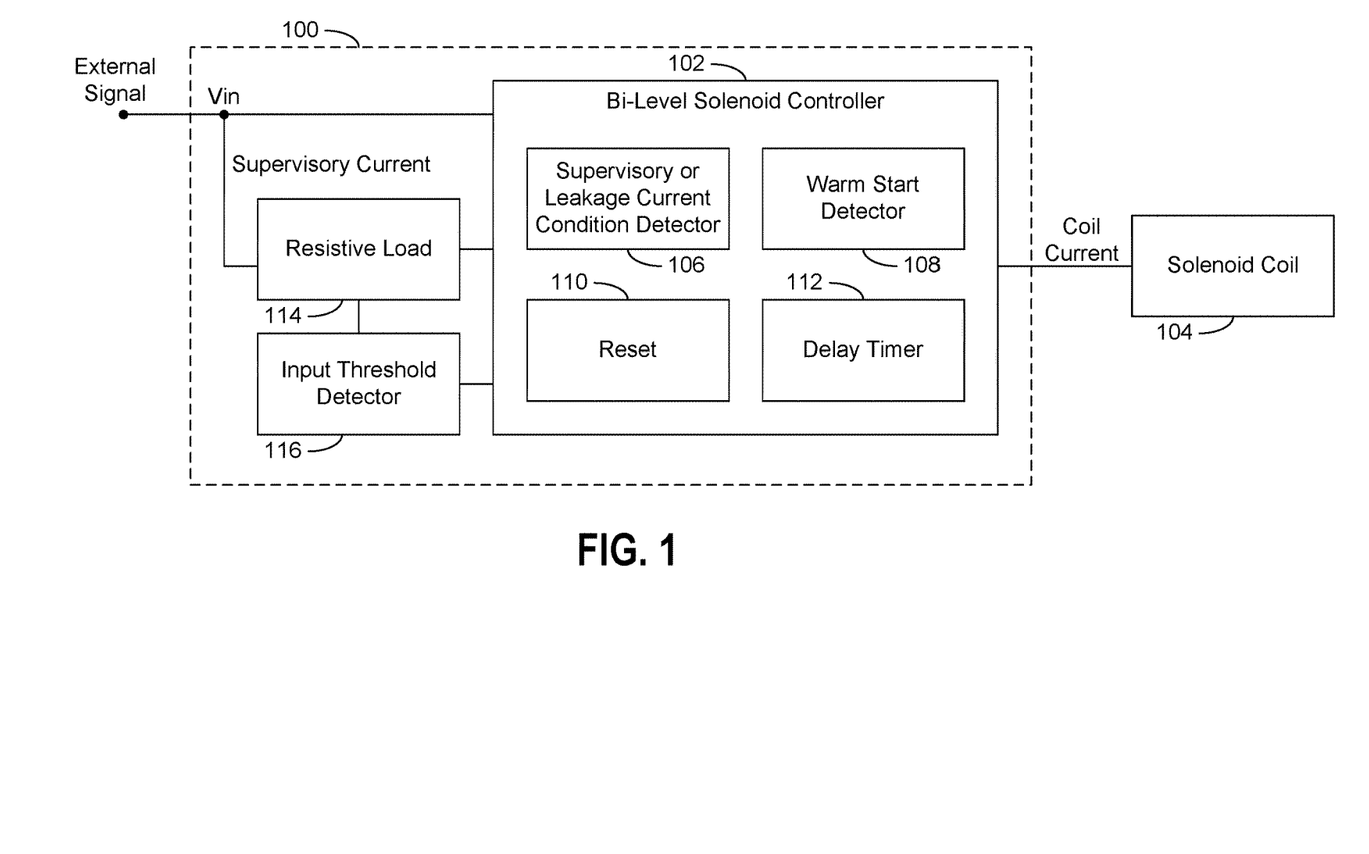
FIG. 1 is a functional block diagram of an exemplary solenoid driver according to the disclosed embodiments.

Turning now to FIG. 1, a functional block diagram is shown of an exemplary driver 100 for a solenoid valve 101 according to the disclosed embodiments. The particular type of driver 100 shown here is a peak-and-hold driver that is capable of applying two levels of power to a solenoid coil 104 based on a signal from an external source, such as external control logic or control circuitry (not expressly shown). Specifically, the driver 100 has a bi-level solenoid controller 102 that is capable of providing the solenoid coil 104 with an initial peak current that is sufficiently large to generate an initial pull-in force to open the valve 101, and thereafter a hold current that is just large enough to generate a hold-in force for holding open the valve 101. In addition, the solenoid controller 102 is also capable of monitoring the presence of a supervisory or leakage current, typically provided by the external source, to ensure the integrity of the wiring between the external source and the solenoid valve 101.

As can be seen in the example of FIG. 1, the solenoid controller 102 has several functional modules therein, which may be implemented as software, firmware, or a combination of both, to support the operation of the controller 102. These functional modules may include, among other things, a supervisory or leakage current condition detector 106, a warm start detector 108, a reset function 110, and a delay timer 112. A resistive load 114 is connected to the solenoid controller 102 for receiving the supervisory or leakage current when the solenoid coil 104 is deenergized, and an input threshold detector 116 is connected to the resistive load 114 and the solenoid controller 102 for detecting an input voltage Vin or at least a portion thereof through the resistive load 114. Various data ports and volatile and nonvolatile memory and the like (not expressly shown) may also be included in the solenoid controller 102. As well, a bridge rectifier (not expressly shown) may be present in some implementations of the solenoid driver 100 to provide power to the solenoid controller 102.

In general, the supervisory or leakage current condition detector 106 monitors the supervisory or leakage current provided by the external source to determine the integrity of the wiring between the solenoid valve 101 and the external source. The warm start detector 108, as the name suggests, checks the solenoid controller 102 after restarting operations by checking, for example, the state of one or more memory locations in the controller 102, to determine whether the controller is starting operations from a powered-up state (in which case the memory, data registers, and the like are maintained) or whether it is starting operations from a cold boot following an initial application of power (in which case the memory, data registers, and the like may contain essentially random values). The reset function 110, when asserted, essentially puts the solenoid controller 102 into a suspended or hold state while the controller remains powered on. The delay timer 112 is used by the solenoid controller 102 to count down (or up) one or more predefined wait periods before executing the remainder of its programming. The input threshold detector 116 is configured to detect the input voltage Vin or at least a portion thereof through the resistive load 114 and assert the reset function 110 if it determines that the solenoid coil 104 is being deenergized based on the level of the input voltage Vin or portion thereof.

In operation, when the valve 101 is to be opened, a signal from the external source causes the input voltage Vin to increase to a sufficiently high voltage level to energize the solenoid coil 104 and the solenoid controller 102 applies or otherwise facilitates application of a corresponding current (e.g., 250 mA) to the solenoid coil 104 to pull in the solenoid coil and open the valve 101. After a specified amount of time (e.g., 60 ms), the solenoid controller 102 applies or otherwise facilitates application of a smaller amount of current (e.g., 70 mA) corresponding to a hold voltage to the solenoid coil 104 to hold in the solenoid coil. Thereafter, the input voltage Vin decreases to a sufficiently low voltage level to deenergize the solenoid coil 104 and the solenoid controller 102 removes or otherwise facilitates removal of current to the solenoid coil 104 to allow the solenoid coil 104 to drop out and open the valve 101.

When the input threshold detector 116 detects that the input voltage Vin, or a percentage thereof, has decreased to below a dropout voltage or some other threshold trip level, indicating that the solenoid coil 104 is being deenergized, it asserts the reset function 110 of the solenoid controller 102. This puts the solenoid controller 102 into a suspended or hold mode that removes or otherwise facilitates removal of current to the solenoid coil 104, allowing the solenoid coil 104 to drop out and open the valve 101. When the input voltage Vin or portion thereof rises above the dropout voltage or other threshold trip level again, the input threshold detector 116 de-asserts the reset function 110 of the solenoid controller 102 and allows the solenoid controller 102 to commence energizing the solenoid coil 104 again. The process may then be repeated as needed to cycle the valve 101.

However, as mentioned above, because the solenoid controller 102 applies two levels of current to the solenoid coil 104, a problem may arise when an excessive amount of supervisory or leakage current flows in the resistive load 114 that exceeds the amount of current for which the resistive load 114 is sized. That is, a condition may occur where, as a result of the supervisory or leakage current, the solenoid controller 102 may prematurely try to energize the solenoid coil 104 during a dropout, which may result in a current flowing in the windings of the solenoid coil 104 that is large enough to not allow the solenoid coil 114 to properly close the valve 101.

In particular, in some embodiments, if the amount of supervisory or leakage current through the resistive load 114 exceeds what the resistive load 114 is sized for, the increased voltage across the resistive load 114 will cause the input threshold detector 116 to switch the supervisory current to the solenoid coil 104. Due to the inductive nature of the solenoid coil 104, the current will start to build up based on the inductive time constant of the coil 104. Because the external source supplying the supervisory or leakage current is impedance limited, as the current drawn by the solenoid coil 104 increases, the effective voltage supplied to the solenoid coil 104 begins to be reduced. When said voltage drops below the threshold level for the threshold detector 116, the threshold detector 116 causes the solenoid controller 102 to switch the supervisory current from the solenoid coil 104 to the resistive load 114. Although the solenoid coil 104 is now effectively disconnected from the external source, there still remains energy stored in its magnetic field. This energy will cause a current to continue to flow and subsequently decay in the solenoid coil 104. At this point the current applied to the resistive load 114 will again be an excessive amount and the voltage detector 116 will divert it once again to the solenoid coil 104. Since the current in the solenoid coil 104 has not yet decayed to zero, the supervisory current applied will try to increase the coil current again. The above process will then repeat itself, and the result is that the current in the solenoid coil 104 will not reach a low enough point to allow the valve mechanism to properly close the valve 101.

To overcome the above problem, in accordance with the disclosed embodiments, the solenoid controller 102 may implement a predefined delay time after restarting operations during which the controller takes no action with respect to the current in the solenoid coil 104. This delay time, which may be measured by the delay timer 112, prevents the solenoid coil 104 from being immediately and prematurely re-energized during a dropout. The duration of the predefined delay time is set sufficiently long to ensure that the solenoid coil 104 will fully and properly drop out before it is re-energized. For example, the delay time may be set to at least twice the time required for the current in the solenoid coil 104 to decay to a value that allows drop out of the solenoid coil 104. In some embodiments, this delay time may be about 120 ms. When the delay timer 112 has finished counting down (or up), the solenoid controller 102 resumes operating again according to its programming.

In some embodiments, depending on the particular implementation, the predefined delay time may be employed selectively, such as only after the solenoid controller 102 has gone through a power-up cycle, as determined by the warm start detector 108. As well, in some embodiments, the predefined delay time may be implemented only if the solenoid coil 104 has previously been energized, as may be determined by detection of an inrush current in a previous cycle. This helps ensure the delay time is not implemented unnecessarily, thereby minimizing the response time of the controller 102 and reducing the time needed to actuate the valve 101.

Figure 2:
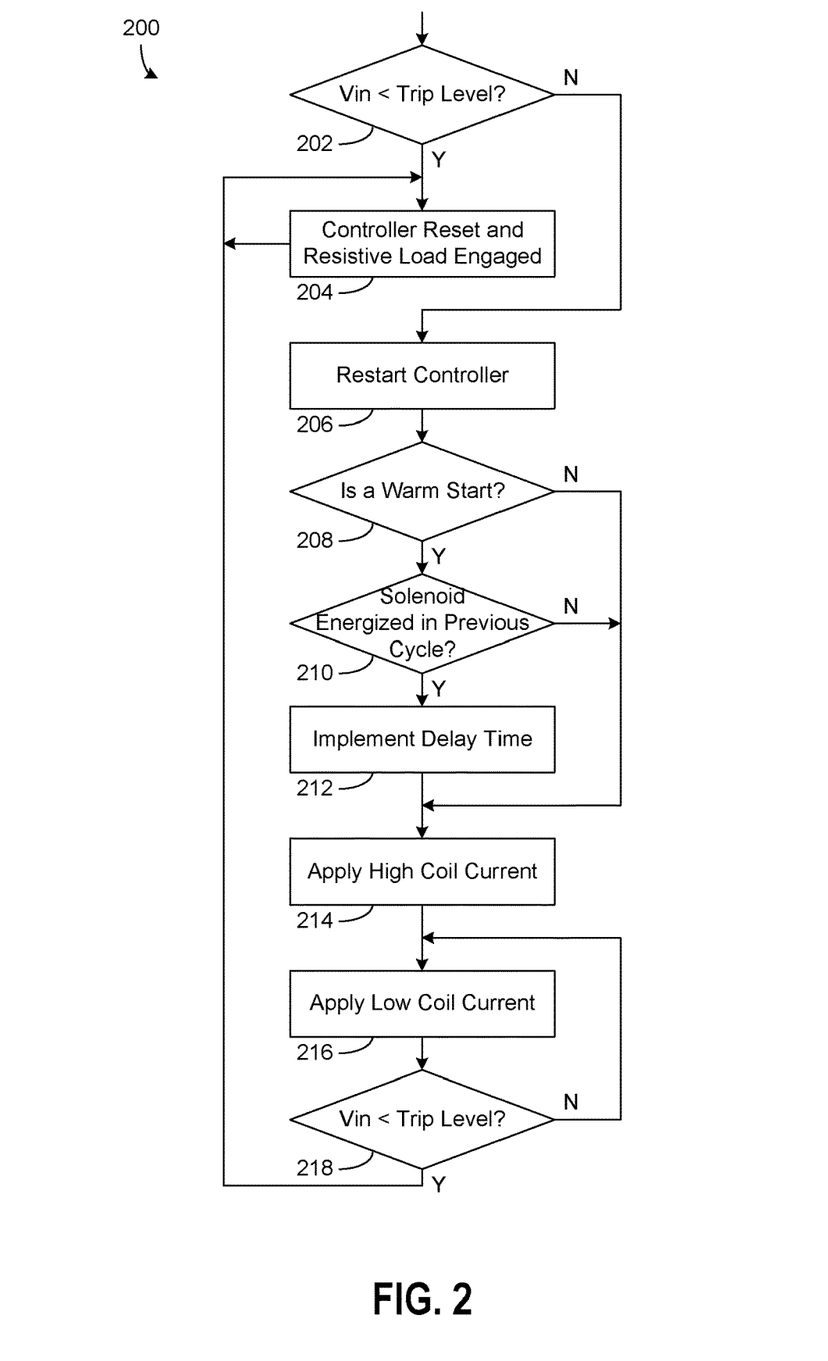
FIG. 2 is a functional flow diagram for an exemplary solenoid driver according to the disclosed embodiments.
Figure 3:
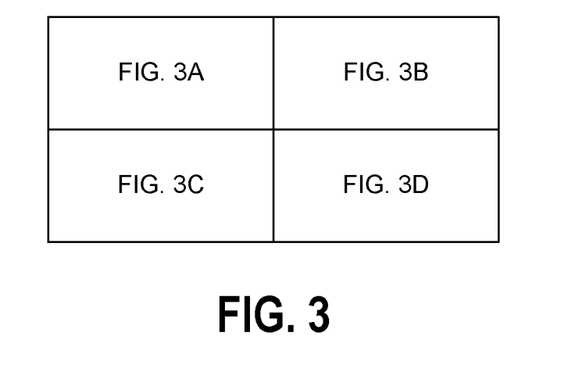
FIGS. 3 and 3A-3D illustrate a schematic diagram of an exemplary solenoid driver according to the disclosed embodiments.
Figure 3A:
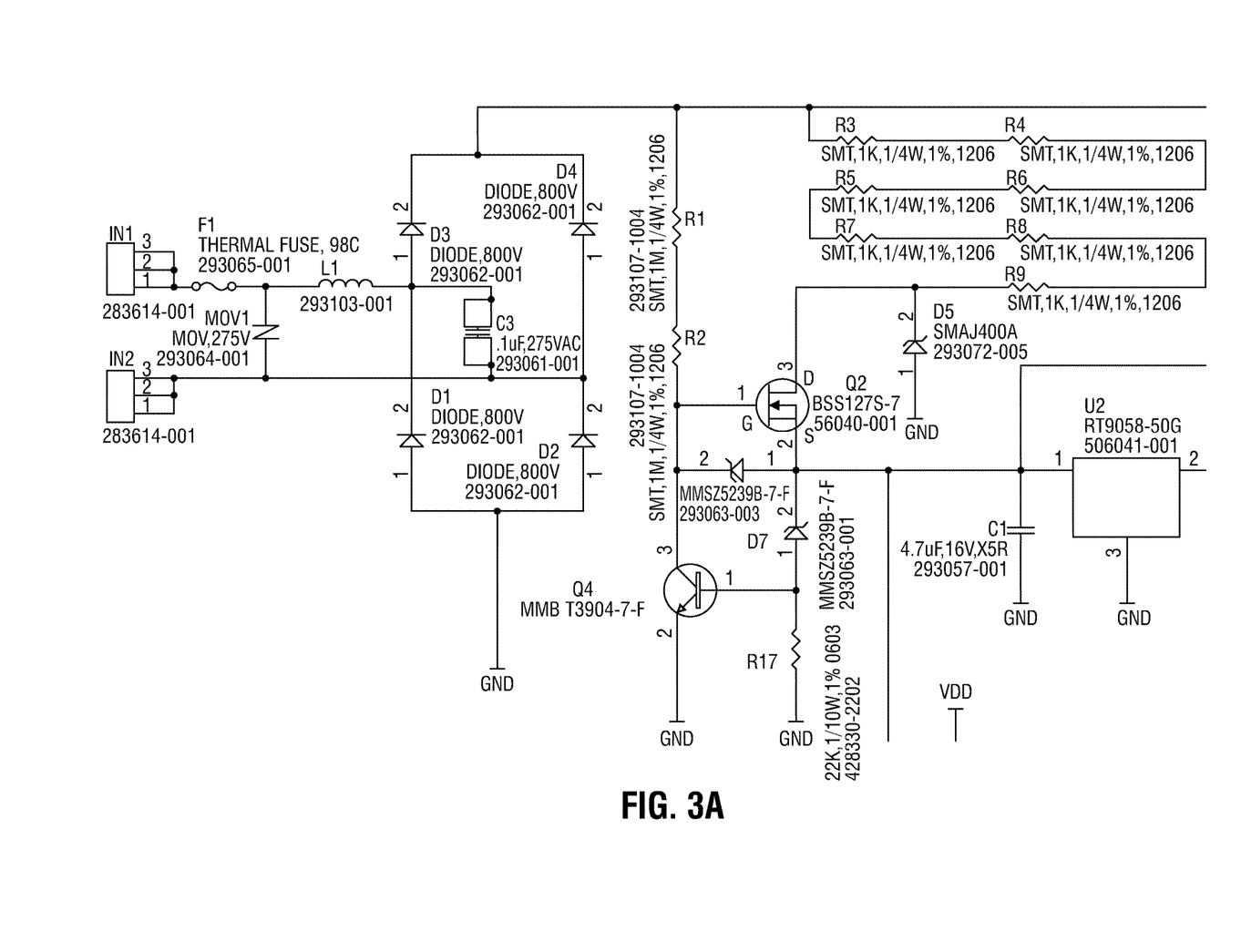
Figure 3B:
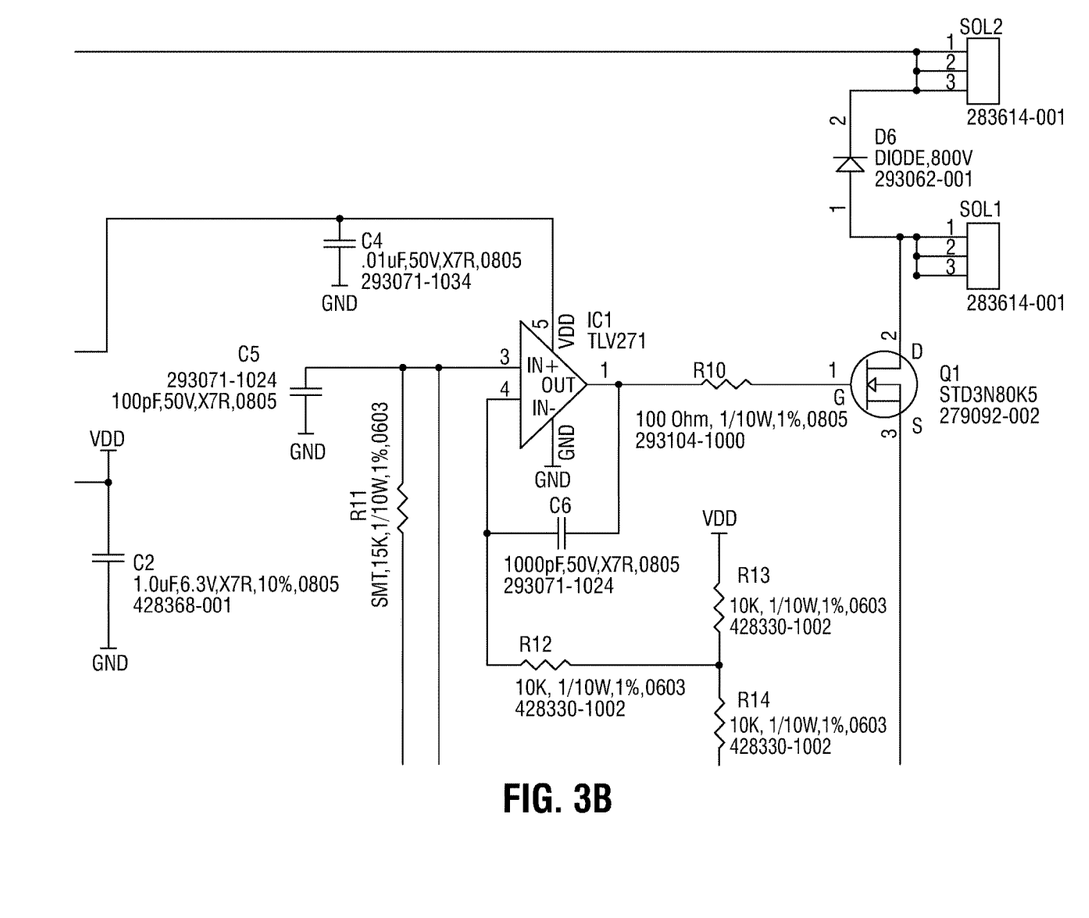
Figure 3C:
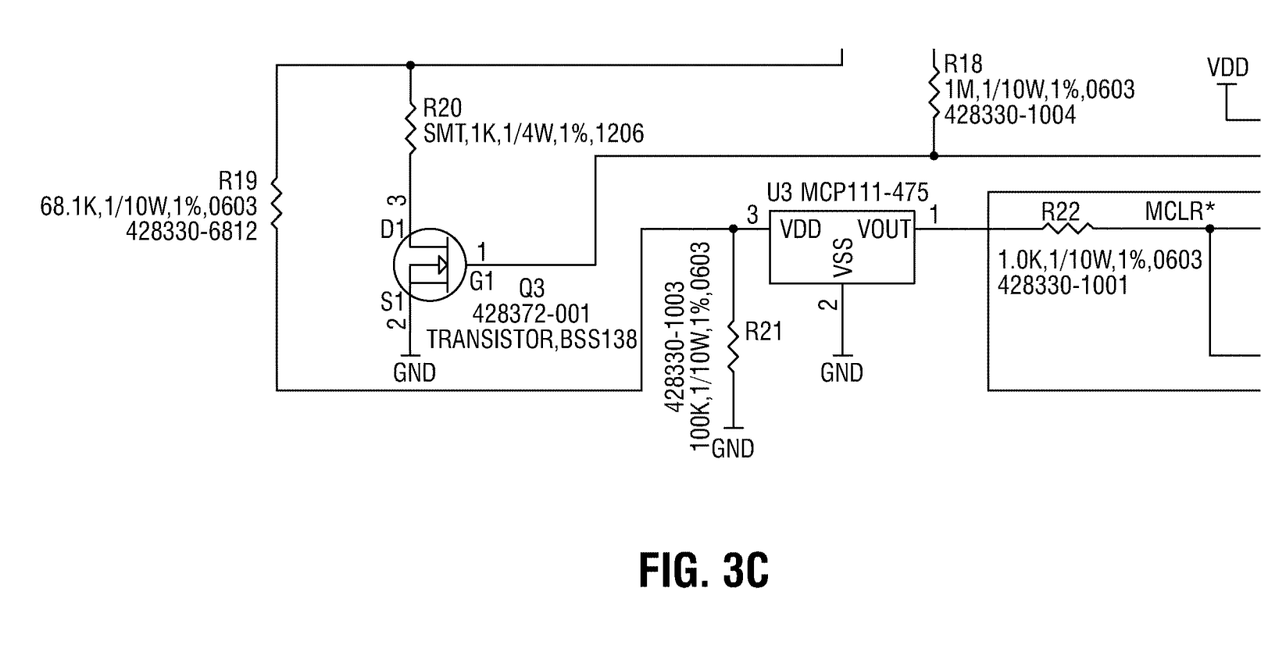
Figure 3D:
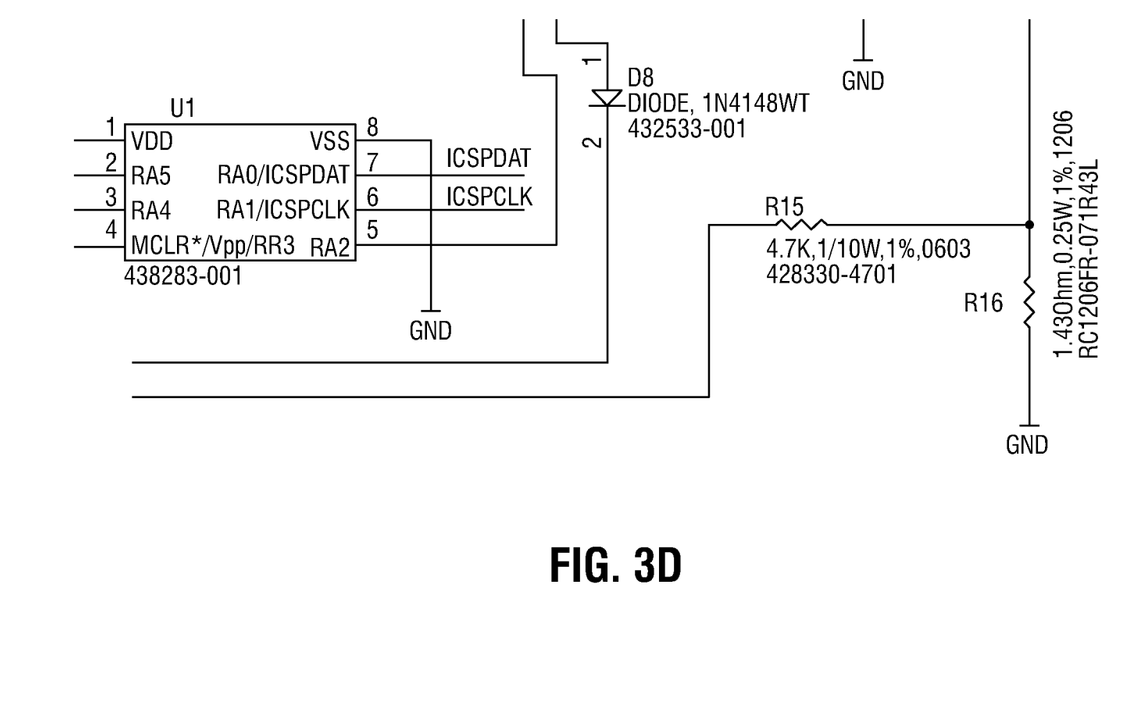
Figure 4:
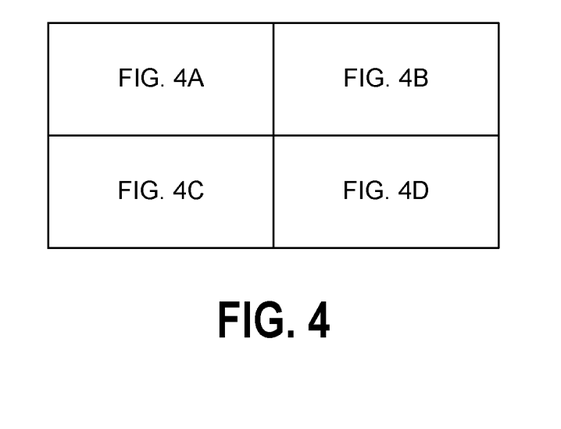
FIGS. 4 and 4A-4D illustrate a schematic diagram of an exemplary alternative solenoid driver according to the disclosed embodiments.
Figure 4A:
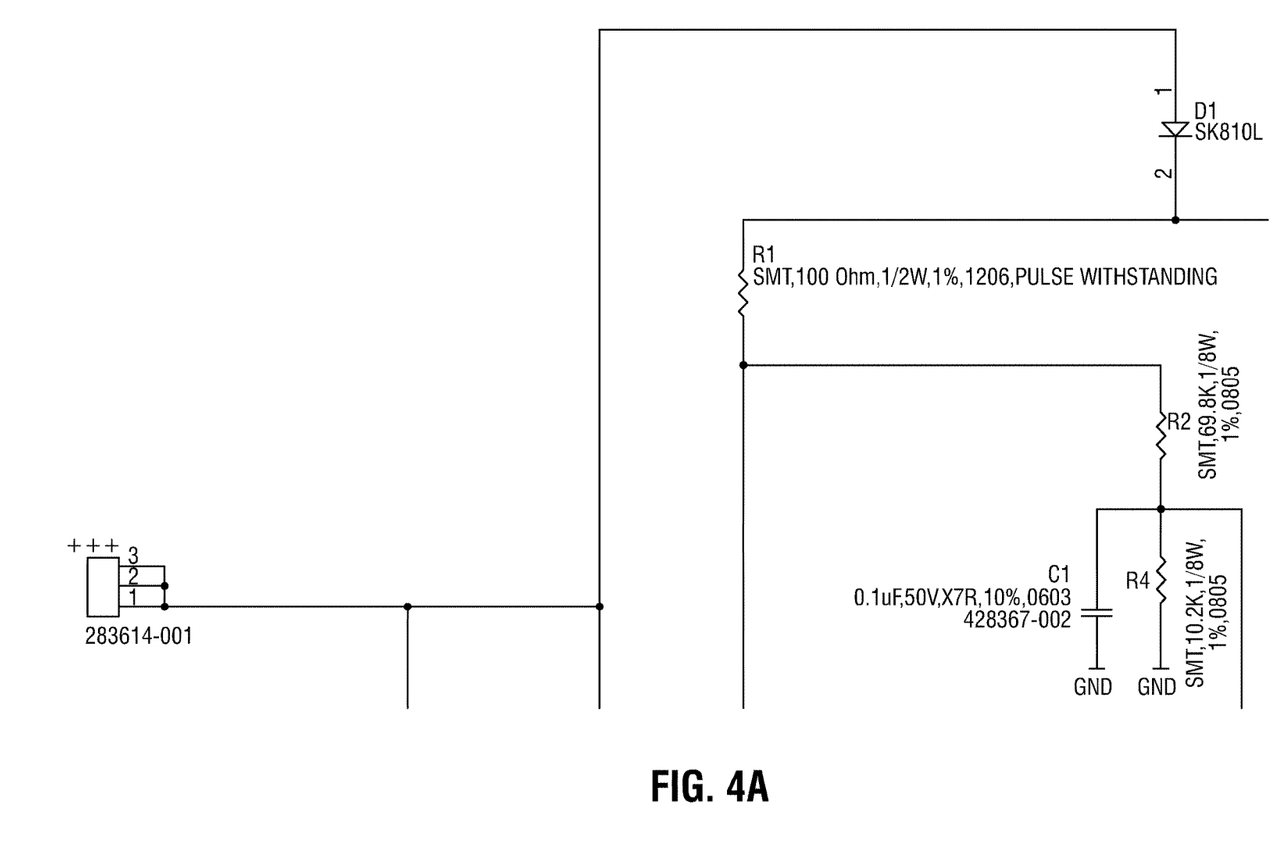
Figure 4B:
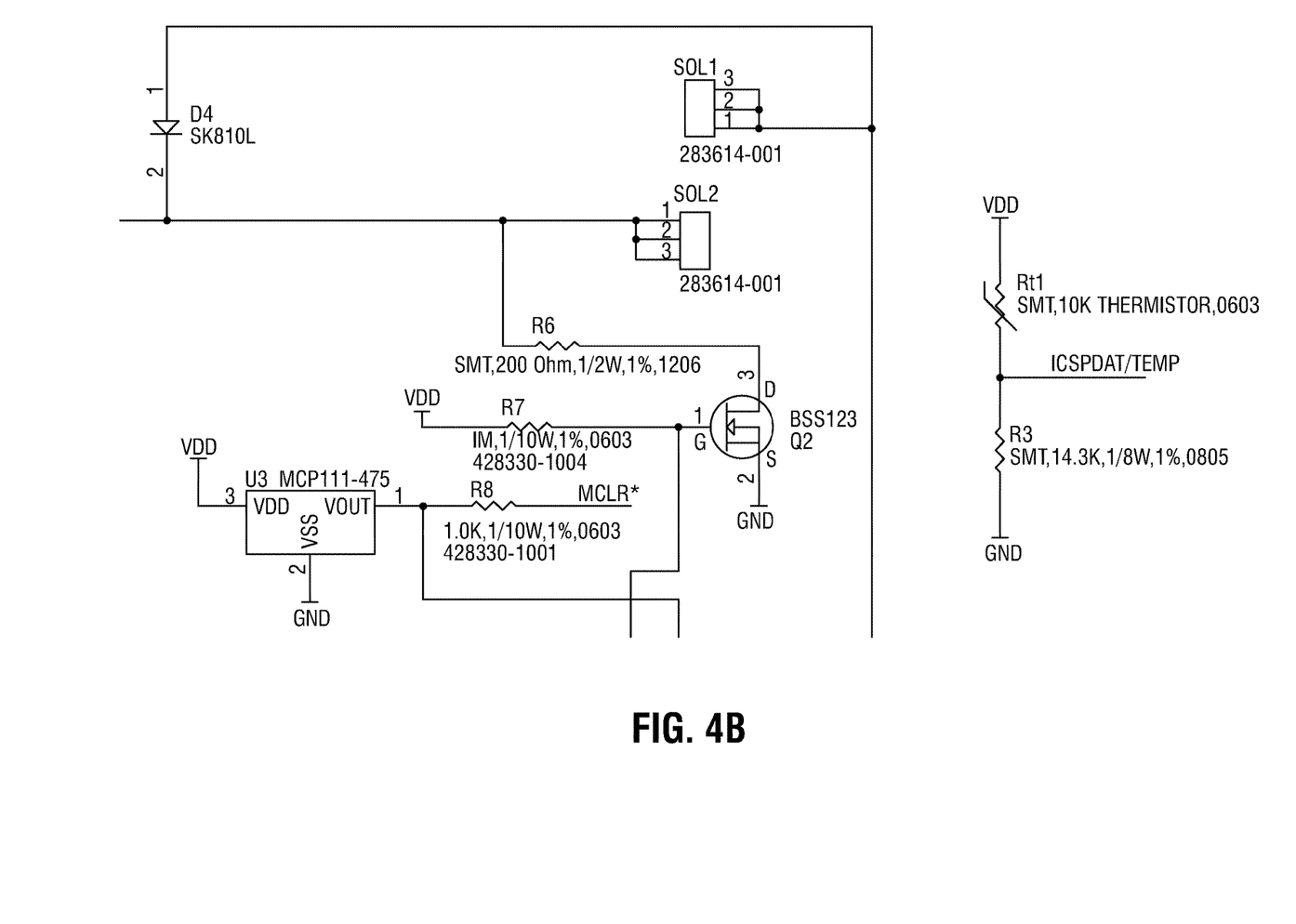
Figure 4C:
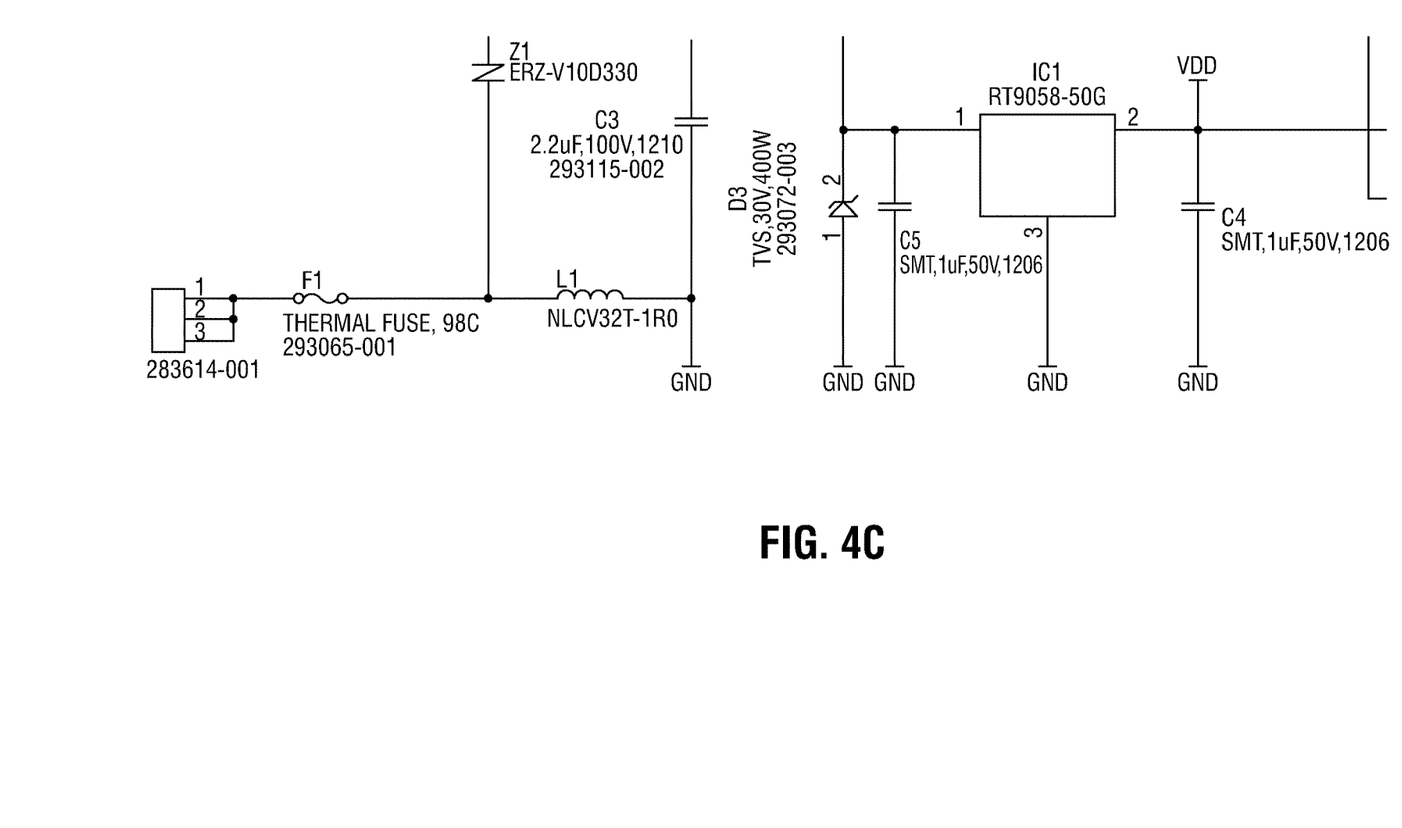
Figure 4D:
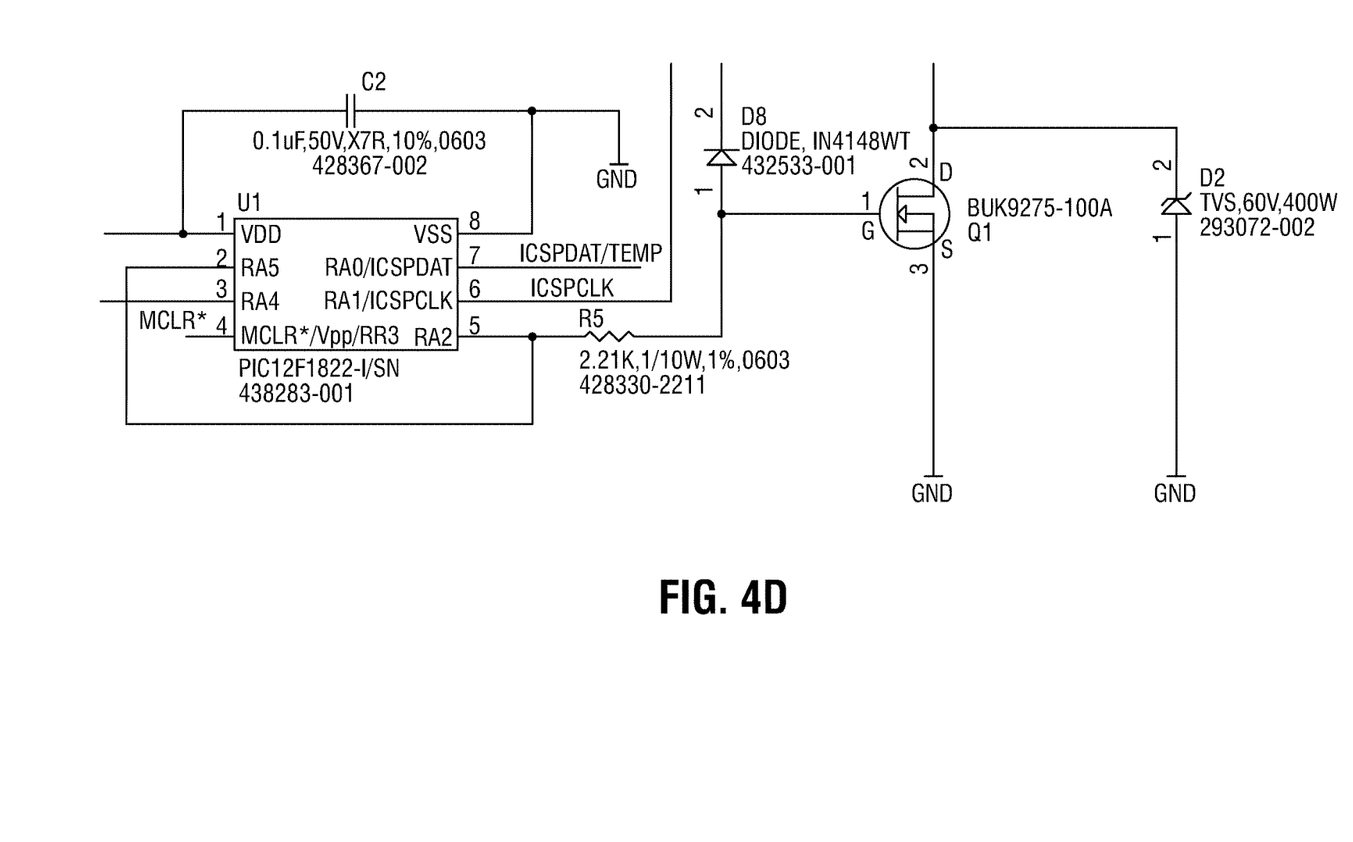

The foregoing process is generally reflected in FIG. 2, which illustrates an exemplary flow diagram representing a method 200 that may be used with or by the solenoid driver 100 in some embodiments. It should be noted that although FIG. 2 (and other figures herein) show a number of discrete blocks, those having ordinary skill in the art will understand that any one of these blocks may be divided into two or more constituent blocks and/or two or more of these blocks may be combined to form a single block as needed without departing from the scope of the disclosed embodiments. In addition, the method 200 may be performed entirely automatically in some embodiments, or parts of the method 200 may be performed automatically and parts of the method 200 may be performed manually as needed.

As can be seen, the method 200 generally begins at block 202, where the input threshold detector makes a determination whether the input voltage Vin is below a dropout voltage or other dropout related threshold trip level, meaning the solenoid coil is being deenergized. If the determination is yes, then the solenoid controller is put in a reset mode at block 204 and the resistive load is connected or otherwise switched in to receive the supervisory or leakage current in conjunction with the solenoid coil being deenergized. If the determination at block 202 is no, then the solenoid controller restarts operations at block 206.

After the solenoid controller restarts operations, a determination is made at block 208 whether the restart was a warm start. If the determination is yes, then at block 210 a determination is made whether the solenoid coil was energized in a previous cycle, for example, by determining whether there was an inrush current in the solenoid coil during the previous cycle. If this determination is yes, then a delay time is implemented at block 212, assuring that the solenoid coil will fully and properly drop out. If the determination in either block 208 or block 210 is no, indicating respectively that the solenoid controller is starting from a cold start and the solenoid coil has not been previously energized, then the delay time at block 212 is not implemented.

Next, a high or peak coil current is applied to the solenoid coil for a predefined amount of time (e.g., 60 ms) at block 214. Thereafter, a low or hold coil current is applied to the solenoid coil at block 216. The low current continues to be applied as long as the input voltage Vin is less than the dropout voltage or some other threshold trip level, which determination is made at block 218. If the determination at block 218 is yes, then the method returns to block 204 where the controller is once again put into reset mode and the resistive load is once again engaged.

FIGS. 3 and 3A-3D illustrate a schematic diagram for an exemplary implementation of a peak-and-hold solenoid driver according to the disclosed embodiments. It should be understood that while the schematic diagram may specify the type, size, and/or part number for one or more components shown therein, those having ordinary skill in the art will understand that alternative components may certainly be used without departing from the scope of the disclosed embodiments. Thus, for example, those having ordinary skill in the art will understand that with appropriate modifications a voltage comparator may be used in place of a current comparator, and vice versa, or a bipolar junction transistor may be used in place of a field-effect transistor, and vice versa, and so forth, without departing from the scope of the disclosed embodiments.

In the implementation of FIGS. 3 and 3A-3D, transistor Q1 controls a solenoid coil, which would be connected between terminals SOL1 and SOL2, under the direction of a solenoid controller U1, which has a pin programmed to control the gate of Q1 through a transistor driver IC1 based on the current flow through resistor R16. A pre-regulator composed of transistors Q2 and Q4, diodes D7 and D10, and resistors R17, R1, and R2 provide a roughly 10 V signal to a 5-volt voltage regulator U2 to power the solenoid controller U1 and the transistor driver IC1. Resistors R3-R9 and R20 form a resistive network or load through which a supervisory or leakage current may flow via transistor Q3. The gate of transistor Q3 is connected to the solenoid controller U1, which controls Q3 essentially as a switch to connect and disconnect the resistive load R3-R9 and R20 from the circuit. When switched in, resistors R3-R9 and R20 will absorb the power from an external power source at terminals IN1 and IN2 as long as the voltage level of the power source is below the threshold voltage of the input voltage detector U3. Resistors R19 and R21 may form a voltage divider for the input voltage detector U3 such that it receives a certain percentage or portion of the voltage from the power source.

In operation, the input voltage detector U3 holds a reset pin of the solenoid controller U1 at a logic low, which maintains the solenoid controller U1 in a reset mode until the voltage level of the power source, or portion thereof, reaches a set threshold voltage, which may be the solenoid coil dropout voltage. Because the solenoid controller U1 is in a reset mode, its pins are in a high impedance state, which causes transistor Q3 to turn on though resistor R15. Turning on Q3 causes the aforementioned load resistors R3-R9 and R20 to draw current from the power source at IN1 and IN2. When the voltage level of the power source, or portion thereof, reaches the threshold voltage of the input voltage detector U3, the input voltage detector U3 releases the reset pin, the solenoid controller U1 exits the high impedance reset mode, causing Q3 to turn off, which disconnects or disengages resistors R3-R9 and R20. Thereafter, the solenoid controller U1 commences executing its programming again, resulting in application of a peak-and-hold current to the solenoid coil at terminals SOL1 and SOL2.

Upon being restarting operations, the solenoid controller U1 checks as part of its programming whether it is restarting from a cold boot or from a powered-up state (i.e., a warm start). If the solenoid controller U1 determines that it is restarting from a powered-up state, then it implements a predefined delay time during which the solenoid controller U1 takes no action with respect to the current of the solenoid coil. The solenoid controller U1 may also determine whether the solenoid coil was previously energized by checking whether there was a previous inrush current via resistor R16 before implementing the delay time. This delay time ensures that the solenoid coil will have enough time to properly drop out before being re-energized. Conversely, if the solenoid controller U1 determines that it is restarting from a cold boot, or that the solenoid coil was not recently energized in a previous cycle, then it forgoes the predefined delay time in order to minimize response time and hence valve actuation time.

FIGS. 4 and 4A-4D illustrate a schematic diagram for an exemplary alternative implementation of a peak-and-hold solenoid driver according to the disclosed embodiments. This implementation is similar to the implementation of FIGS. 3 and 3A-3D except that it has been configured to operate from an external power source that is a DC power source (whereas the implementation of FIGS. 3 and 3A-3D is configured to operate from either an AC or DC power source).

While particular aspects, implementations, and applications of the present disclosure have been illustrated and described, it is to be understood that the present disclosure is not limited to the precise construction and compositions disclosed herein. For example, instead of the solenoid coil assembly resembling a rectangular shaped prism, in some embodiments, the solenoid coil assembly may have a somewhat cylindrical shape, or the like. Therefore, various modifications, changes, and variations may be apparent from the foregoing descriptions without departing from the spirit and scope of the disclosed embodiments as defined in the appended claims.

What is claimed is:

1. A peak-and-hold driver for a solenoid coil, comprising:
a solenoid controller connectable to the solenoid coil and configured to apply two levels of current to the solenoid coil to energize the solenoid coil, the two levels of current including a peak current and a hold current;
an input threshold detector connected to the solenoid controller and configured to put the solenoid controller in a reset mode; and
a resistive load connected to the threshold detector and configured to receive a supervisory current when the solenoid coil is deenergized, the resistive load providing at least a portion of the supervisory current to the threshold detector;
wherein the input threshold detector puts the solenoid controller in the reset mode if the supervisory current provided to the input threshold detector, or a voltage corresponding to said supervisory current, is below a threshold level, and releases the controller from the reset mode if the supervisory current provided to the input threshold detector, or a voltage corresponding to said supervisory current, is above the threshold level.

2. The peak-and-hold driver of claim 1, wherein the threshold level is a threshold current level of 10 mA.

3. The peak-and-hold driver of claim 1, wherein the solenoid controller is configured to restart operations upon being released from the reset mode, further comprising a warm start detector in the solenoid controller, the warm start detector configured to determine whether the solenoid controller restarts operations from a powered-up state.

4. The peak-and-hold driver of claim 3, further comprising a delay timer in the solenoid controller, the delay timer configured to count down a predefined delay time if the warm start detector determines that the solenoid controller restarted from a powered-up state.

5. The peak-and-hold driver of claim 4, wherein the predefined delay time is at least twice the time required for current in the solenoid coil to decay to a value that allows drop out of the solenoid coil.

6. A method of assuring drop out of a solenoid coil in a peak-and-hold driver, comprising:
applying two levels of current to the solenoid coil to energize the solenoid coil, the two levels of current including a peak current and a hold current;
receiving a supervisory current in a resistive load when the solenoid coil is deenergized;
detecting whether at least a portion of the supervisory current, or a voltage corresponding to said supervisory current, is above a threshold level;
preventing application of current to the solenoid coil if the at least a portion of supervisory current, or a voltage corresponding to said supervisory current, is below the threshold level; and
allowing application of current to the solenoid coil if the at least a portion of the supervisory current, or a voltage corresponding to said supervisory current, is above the threshold level.

7. The method of claim 6, wherein the threshold level is a threshold current level of 10 mA.

8. The method of claim 6, further comprising determining whether the solenoid coil was previously energized.

9. The method of claim 8, further comprising implementing a delay time before allowing application of current to the solenoid coil if the solenoid coil was previously energized.

10. The method of claim 9, wherein the predefined delay time is at least twice the time required for current in the solenoid coil to decay to a value that allows drop out of the solenoid coil.

11. A solenoid valve system, comprising:
a solenoid-controlled valve having a solenoid coil therein;
a solenoid controller connectable to the solenoid coil and configured to apply two levels of current to the solenoid coil to energize the solenoid coil, the two levels of current including a peak current and a hold current;
an input threshold detector connected to the solenoid controller and configured to put the solenoid controller in a reset mode; and
a resistive load connected to the threshold detector and configured to receive a supervisory current when the solenoid coil is deenergized, the resistive load providing at least a portion of the supervisory current to the threshold detector;
wherein the input threshold detector puts the solenoid controller in the reset mode if the supervisory current provided to the input threshold detector, or a voltage corresponding to said supervisory current, is below a threshold level, and releases the controller from the reset mode if the supervisory current provided to the input threshold detector, or a voltage corresponding to said supervisory current, is above the threshold level.

12. The system of claim 11, wherein the threshold level is a threshold current level of 10 mA.

13. The system of claim 11, wherein the solenoid controller is configured to restart operations upon being released from the reset mode, further comprising a warm start detector in the solenoid controller, the warm start detector configured to determine whether the solenoid controller restarts operations from a powered-up state.

14. The system of claim 13, further comprising a delay timer in the solenoid controller, the delay timer configured to count down a predefined delay time if the warm start detector determines that the solenoid controller restarted from a powered-up state.

15. The system of claim 14, wherein the predefined delay time is at least twice the time required for current in the solenoid coil to decay to a value that allows drop out of the solenoid coil.

* * * * *